US009369470B2

(12) United States Patent
Maret et al.

(10) Patent No.: US 9,369,470 B2
(45) Date of Patent: Jun. 14, 2016

(54) USER COLLISION DETECTION AND HANDLING

(71) Applicant: Adobe Systems Incorporated, San Jose, CA (US)

(72) Inventors: Timothee Vincent Maret, Basel (CH); Antonio Sanso, Allschwil (CH)

(73) Assignee: Adobe Systems Incorporated, San Jose, CA (US)

( * ) Notice: Subject to any disclaimer, the term of this patent is extended or adjusted under 35 U.S.C. 154(b) by 28 days.

(21) Appl. No.: 14/048,851

(22) Filed: Oct. 8, 2013

(65) Prior Publication Data

US 2015/0101030 A1    Apr. 9, 2015

(51) Int. Cl.
    *H04L 29/06*    (2006.01)
(52) U.S. Cl.
    CPC .............. *H04L 63/102* (2013.01); *H04L 63/10* (2013.01); *H04L 63/20* (2013.01)
(58) Field of Classification Search
    CPC .... H04L 63/0815; H04L 63/10; H04L 63/102
    See application file for complete search history.

(56) References Cited

U.S. PATENT DOCUMENTS

| 7,421,395 B1 * | 9/2008 | Link ...................... G06Q 50/01 |
| | | 705/319 |
| 8,838,488 B1 * | 9/2014 | Breau et al. ..................... 705/34 |
| 2003/0126400 A1 * | 7/2003 | Debiez et al. ................. 711/216 |
| 2006/0173794 A1 * | 8/2006 | Sellars .................... G06F 21/10 |
| | | 705/76 |
| 2006/0236382 A1 * | 10/2006 | Hinton et al. ..................... 726/8 |
| 2007/0100929 A1 * | 5/2007 | DeRobertis et al. .......... 709/200 |
| 2009/0328186 A1 * | 12/2009 | Pollutro et al. ................. 726/13 |

\* cited by examiner

*Primary Examiner* — Robert Leung
(74) *Attorney, Agent, or Firm* — Wolfe-SBMC

(57) ABSTRACT

Techniques for user collision detection and handling are described. According to various embodiments, a network resource provides content, services, and so forth, for consumption by authenticated users. To perform authentication tasks, the network resource leverages authentication services. Since a network resource may utilize multiple authentication services, collisions between users may occur. For instance, a user identifier for a user authenticated by one authentication service may match a user identifier for a different user authenticated by a different authentication service. Thus, techniques discussed herein are employed to detect such collisions and to handle the collisions such that users are differentiated from one another for authentication and resource access purposes.

20 Claims, 7 Drawing Sheets

USER COLLISION DETECTION AND HANDLING

BACKGROUND

In today's digital environment, protecting user information and user resources from unauthorized access is increasingly important. Accordingly, different ways of verifying that a user "is who they say they are" have been developed. Such processes and techniques are typically referred to as user authentication. Authentication is utilized in a myriad of different scenarios, and particularly for controlling access to network-based (e.g., web-based) resources.

In a common scenario, a user profile is generated for a user that enables the user to access a particular network resource. The user profile is associated with a user identifier (e.g., a username) that differentiates the user from other users. The user profile is also typically associated with some form of authentication factor (e.g., a password) that the user provides to verify the identity of the user and enable the user to access the network resource.

While a network resource may utilize its own particular authentication procedure, network resources often leverage third-party authentication providers to authenticate users. For instance, one website may enable a user to login via a user profile created for and managed by another, different website. Various protocols exist for enabling third-party authentication, such as OAuth, OpenID, and so forth.

While utilizing third-party authentication providers is a convenient way to authenticate users, it also presents some implementation challenges. For instance, consider a scenario where a particular network resource utilizes multiple third-party authentication providers. While a particular user identifier may be unique at a single third-party authentication provider, it may be duplicated across multiple third-party authentication providers. Further, the same user identifier may be associated one user at one third-party authentication provider, and with a different user at a different third-party authentication provider. Such user identifier collisions can cause problems for network resources that use multiple third-party authentication providers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for user collision detection and handling are described. According to various embodiments, a network resource provides content, services, and so forth, for consumption by authenticated users. To perform authentication tasks, the network resource leverages authentication services. Since a network resource may utilize multiple authentication services, collisions between users may occur. For instance, a user identifier for a user authenticated by one authentication service may match a user identifier for a different user authenticated by a different authentication service. Thus, techniques discussed herein are employed to detect such collisions and to handle the collisions such that users are differentiated from one another for authentication and resource access purposes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for user collision detection and handling are described. According to various embodiments, a network resource provides content, services, and so forth, for consumption by authenticated users. Examples of a network resource include a website, a social networking platform, a content store, and so forth. To perform authentication tasks, the network resource leverages authentication services. Generally, authentication services refer to third-party authentication providers that can perform authentication tasks for different network resources. Thus, a particular authentication service may not be directly maintained by the network resource, but may be leveraged by the network resource to perform user authentication.

Since a network resource utilizes multiple authentication services, collisions between users may occur. For instance, a user identifier for a user authenticated by one authentication service may match a user identifier for a different user authenticated by a different authentication service. Thus, techniques discussed herein are employed to detect such collisions and to handle the collisions such that users are differentiated from one another for authentication and resource access purposes.

In at least some embodiments, a resource user identifier is generated by a network resource for a user that is authenticated for access to the network resource. The resource user identifier, for example, is generated by processing an authentication user identifier used to authenticate the user with an authentication service. A user collision occurs in the network resource when the resource user identifier generated for the authenticated user matches a resource user identifier for a different authenticated user for the resource. The collision is detected, for example, when it is determined that the authentication user identifier for the user (e.g., that is used to generate the resource user identifier) does not match an authentication user identifier for the different authenticated user. In at least some embodiments, the collision is handled by either mapping the authenticated user to a different existing user profile, or generating a new user profile for the authenticated user.

The authenticated user can access the network resource utilizing the existing user profile or the new user profile.

In the following discussion, an example environment is first described that is operable to employ techniques described herein. Next, a section entitled "Example Procedures" describes some example methods for user collision detection and handling in accordance with one or more embodiments. Finally, a section entitled "Example System and Device" describes an example system and device that are operable to employ techniques discussed herein in accordance with one or more embodiments.

Example Environment

Figure 1:
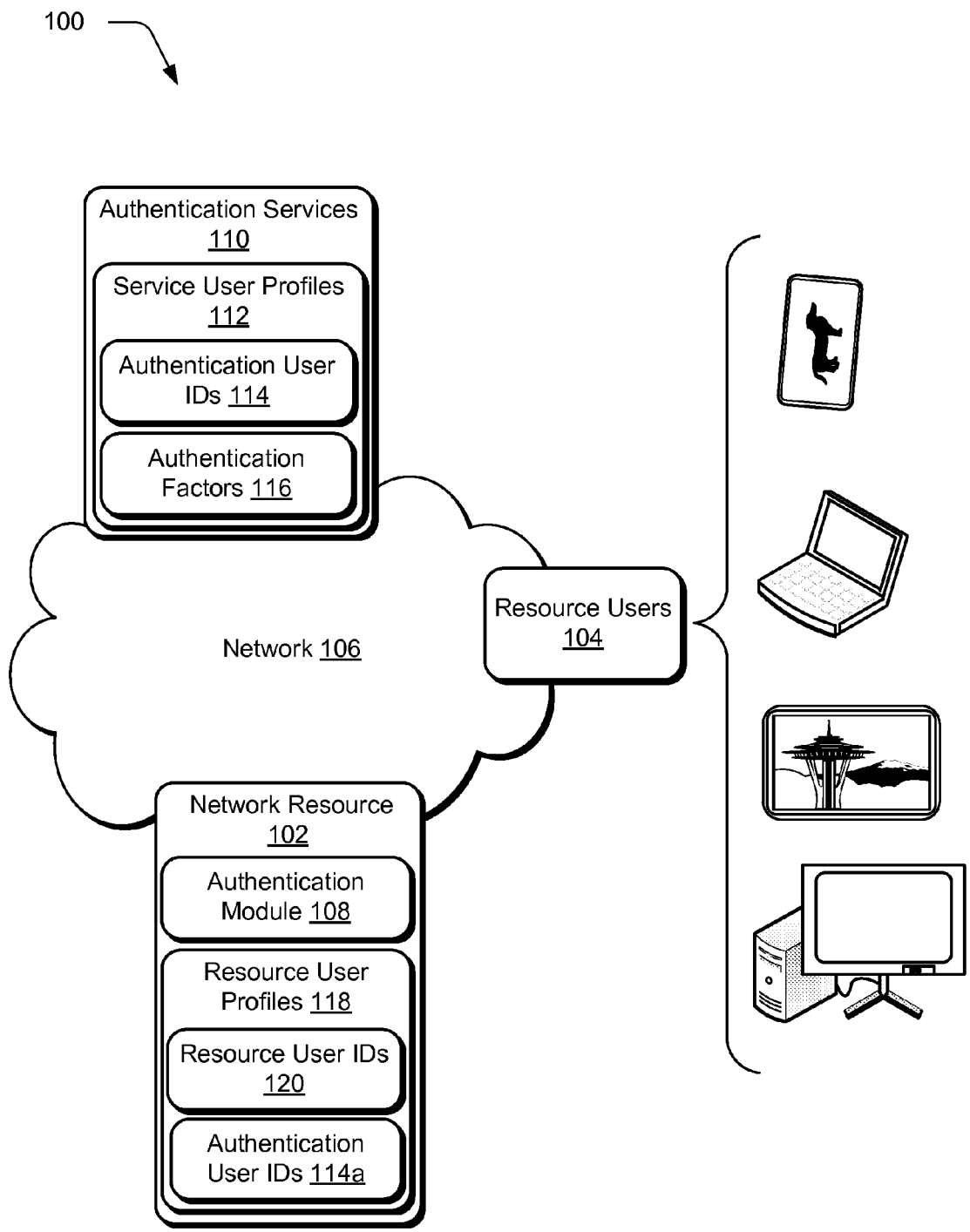
FIG. 1 is an illustration of an environment in an example implementation that is operable to employ techniques discussed herein in accordance with one or more embodiments.

FIG. 1 is an illustration of an environment 100 in an example implementation that is operable to employ techniques for user collision detection and handling discussed herein. Environment 100 includes a network resource 102, which is representative of various types of resources that can be accessed by resource users 104 via one or more networks 106. Examples of the network resource 102 includes a content store, a network-hosted application (e.g., a web app), a network-hosted service, a social media platform, a website, and so forth. Generally, the network resource 102 represents any type of resource that the resource users 104 may access to obtain and/or access content, services, and so forth. The network resource 102 can be implemented via various types and/or combinations of computing devices, examples of which are described below in FIG. 7.

The one or more networks 106 are representative of networks via which various entities of the environment 100 may communicate. The network(s) 106 may assume a variety of different configurations, such as a local area network (LAN), a wide area network (WAN), the Internet, and so on. In at least some embodiments, functionalities discussed with reference to the environment 100 and/or other portions of the discussion herein may be implemented in a distributed environment (e.g., "over the cloud"), as further described in relation to FIG. 7.

The network resource 102 includes an authentication module 108, which is representative of functionality to enable authentication of the resource users 104 for access to the network resource 102. In at least some embodiments, the authentication module 108 may not perform actual authentication procedures itself, but may serve as an authentication broker that leverages one or more authentication services 110 to authenticate the resource users 104. Alternatively or additionally, authentication-related tasks may be distributed between the authentication module 108 and the authentication services 110.

According to various embodiments, the authentication services 110 are representative of different services that can be accessed to authenticate users for various resources. The authentication services 110 maintain service user profiles 112, which are representative of user profiles for the resource users 104 that are generated and/or maintained by the authentication services 110. The service user profiles 112 include authentication user identifiers (IDs) 114 which are used by the authentication services 110 to differentiate users from one another. The service user profiles 112 further include authentication factors 116 (e.g., passwords, tokens, biometric data, and so forth) which are used during authentication processes.

In at least some embodiments, each of the service user profiles 112 and the corresponding authentication user IDs 114 are specific to a particular user. Further, a particular authentication user ID 114 is typically unique to an instance of the authentication services 110. However, since multiple authentication services 110 are available, it is possible that a particular authentication user ID 114 may be used in more than one of the authentication services 110. Further, a particular authentication user ID 114 may be associated with a particular user in one of the authentication services 110, and may be associated with a different user in another of the authentication services 110. Thus, techniques discussed herein may be employed to handle collisions between different users that may occur when utilizing the authentication services 110 to authenticate with the network resource 102.

In at least some embodiments, the authentication service 110 may be hosted by a particular network resource, such as a social media platform, an online communication service (e.g., a voice communication service, a messaging service, and so forth), an email service, a website, and so forth. Thus, the resource user 104 may authenticate with a particular authentication service 110 to access content and/or services provided by the particular authentication service 110.

According to embodiments discussed herein, the authentication services 110 may also be leveraged by other resources separate and remote from the authentication services 110 to perform authentication procedures, such as for the network resource 102. Thus, the authentication services 110 generally represent third-party authentication providers that may be leveraged by a variety of different services and/or resources for authentication. To perform different authentication tasks, the authentication services 110 may employ one or more of a variety of different authentication protocols, such as OAuth, OpenID, Security Assertion Markup Language (SAML), and so forth.

As an example implementation scenario, consider that the resource user 104 requests access to the network resource 102. The resource user 104, for example, may request access to content and/or services provided by the network resource 102. Before allowing the resource user 104 to access the network resource 102, an authentication procedure is implemented to verify the identity of the resource user 104 as a user authorized to access the network resource 102.

As part of the authentication procedure, the resource user 104 is prompted to provide authentication information, such as a user identifier (user ID) and some form of authentication factor, such as a password. The authentication module 108, for instance, can present a graphical user interface (GUI) that enables the user to provide the authentication information. Alternatively, the authentication module 108 can redirect the resource user 104 to one of the authentication services 110, which then implements its own particular authentication procedure.

Continuing with the example scenario, consider that the resource user 104 successfully authenticates with the authentication service 110. For instance, the resource user 104 provides a user ID and an authentication factor that match one of the authentication user IDs 114 and authentication factors 116 for one of the service user profiles 112. The authentication service 110 notifies the network resource 102 that the resource user 104 is successfully authenticated, and provides some or all of the authentication information provided by the user. The authentication service 110, for example, provides the authentication user ID 114 for the resource user 104 to the network resource 102.

The authentication module 108 receives the verification of authentication, along with the authentication user ID 114 for the resource user 104. The authentication module 108 then applies a hash function to the authentication user ID 114 to generate a hashed user ID. The hashed authentication user ID is utilized by the network resource 102 to identify the resource user 104 and to enable the resource user 104 to access the network resource 102.

The authentication module 108 then checks the hashed authentication user ID against resource user profiles 118 maintained by the network resource 102, and specifically against resource user identifiers 120 of the resource user profiles 118. Generally, the resource user profiles 118 represent profiles for different users that are authorized to access the network resource 102, and the resource user IDs 120 are used by the network resource 120 to differentiate resource user profiles 118 from one another and thus different users from one another.

If the hashed authentication user ID does not match one of the resource user IDs 120, a new user profile is created utilizing the hashed authentication user ID as one of the resource user IDs 120 for a new instance of the resource user profiles 118. The new user profile 118 for the user includes various information about the resource user 104, such as the authentication user ID 114 utilized by the authentication service 110 to identify the user, the resource user ID 120 generated by the network resource 102 to identify the user, and so forth. The authentication user ID 114 for the user is stored as part of authentication user IDs 114a of the resource user profiles 118. In at least some embodiments, the authentication user IDs 114a are duplicates of the authentication user IDs 114 and are utilized as part of collision detection and handling techniques discussed herein.

Alternatively, if the hashed authentication user ID does match one of the resource user IDs 120 of the resource user profiles 118, various collision detection and/or handling procedures discussed herein are implemented to ensure that the resource user 104 is correctly identified and differentiated from other users before permitting the resource user 104 to access the network resource 102. Various aspects of the collision detection and handling procedures are discussed in detail below.

Having described an example environment in which the techniques described herein may operate, consider now a discussion of some example procedures in accordance with one or more embodiments.

Example Procedures

The following section describes some example procedures for user collision detection and handling in accordance with one or more embodiments. The example procedures may be employed in the environment 100 of FIG. 1, the system 700 of FIG. 7, and/or any other suitable environment. In at least some embodiments, the steps described for the various procedures are implemented automatically and independent of user interaction.

Figure 2:
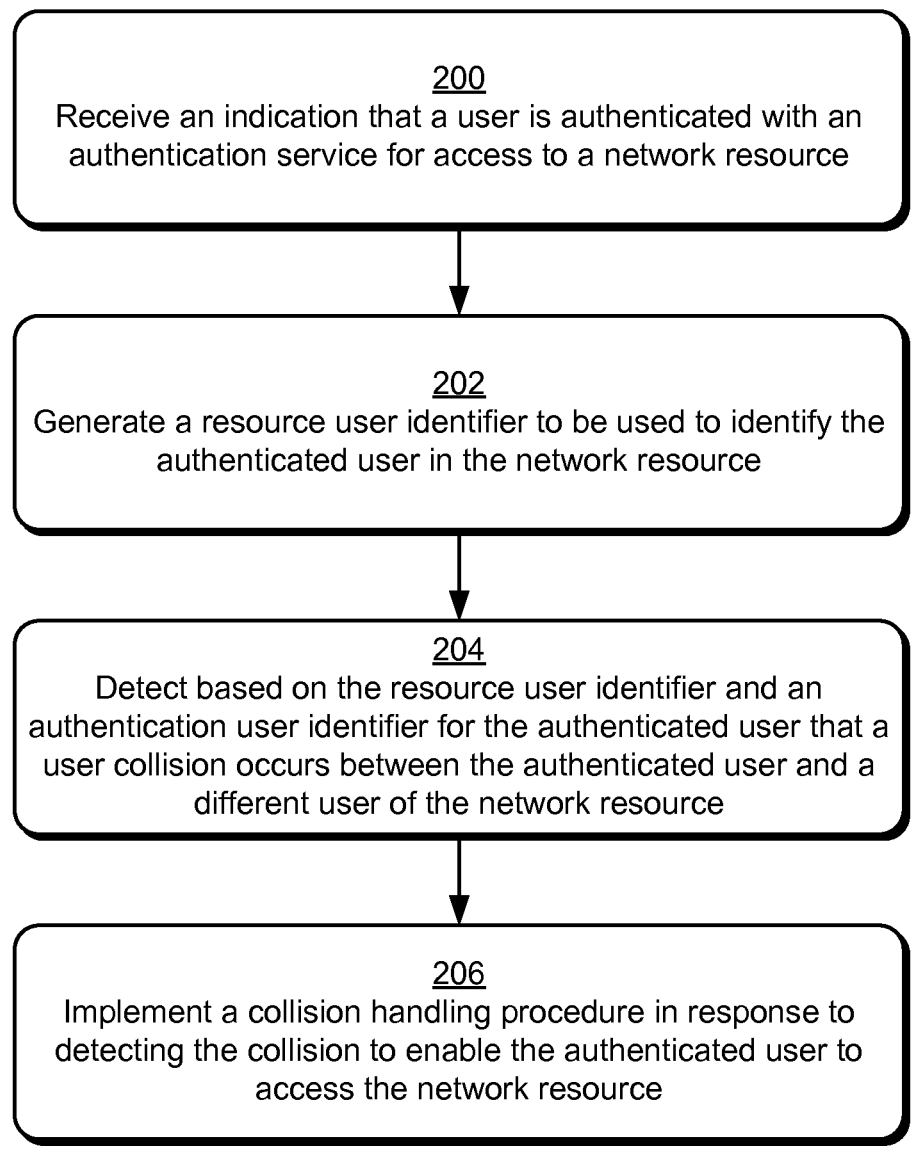
FIG. 2 is a flow diagram that describes steps in a general method for collision detection and handling in accordance with one or more embodiments.

FIG. 2 is a flow diagram that describes steps in a method in accordance with one or more embodiments. Step 200 receives an indication that a user is authenticated with an authentication service for access to a network resource. The network resource 102, for example, receives a notification from the authentication service 110 that the resource user 104 has been authenticated. The notification includes an authentication user ID 114 for the authenticated user.

Step 202 generates a resource user identifier to be used to identify the authenticated user in the network resource. The resource user ID, for example, can be generated based on an authentication user ID for the user received from the authentication service. Example ways of generating a resource user ID are detailed below.

Step 204 detects based on the resource user identifier and an authentication user identifier for the authenticated user that a user collision occurs between the authenticated user and a different user of the network resource. For instance, the resource user ID generated for the authenticated user matches a resource user ID for the different user, but the authentication user ID for the authenticated user does not match an authentication user ID for the different user. Details concerning collision detection between users are provided below.

Step 206 implements a collision handling procedure in response to detecting the collision to enable the authenticated user to access the network resource. As detailed below, for example, collision handling procedures can resolve the collision to enable the authenticated user to access the network resource by matching the authenticated user to an existing user profile for the authenticated user, or by creating a new user profile for the authenticated user.

Consider now some example procedures that provide detailed ways for implementing aspects of collision detection and handling in accordance with one or more embodiments.

Figure 3:
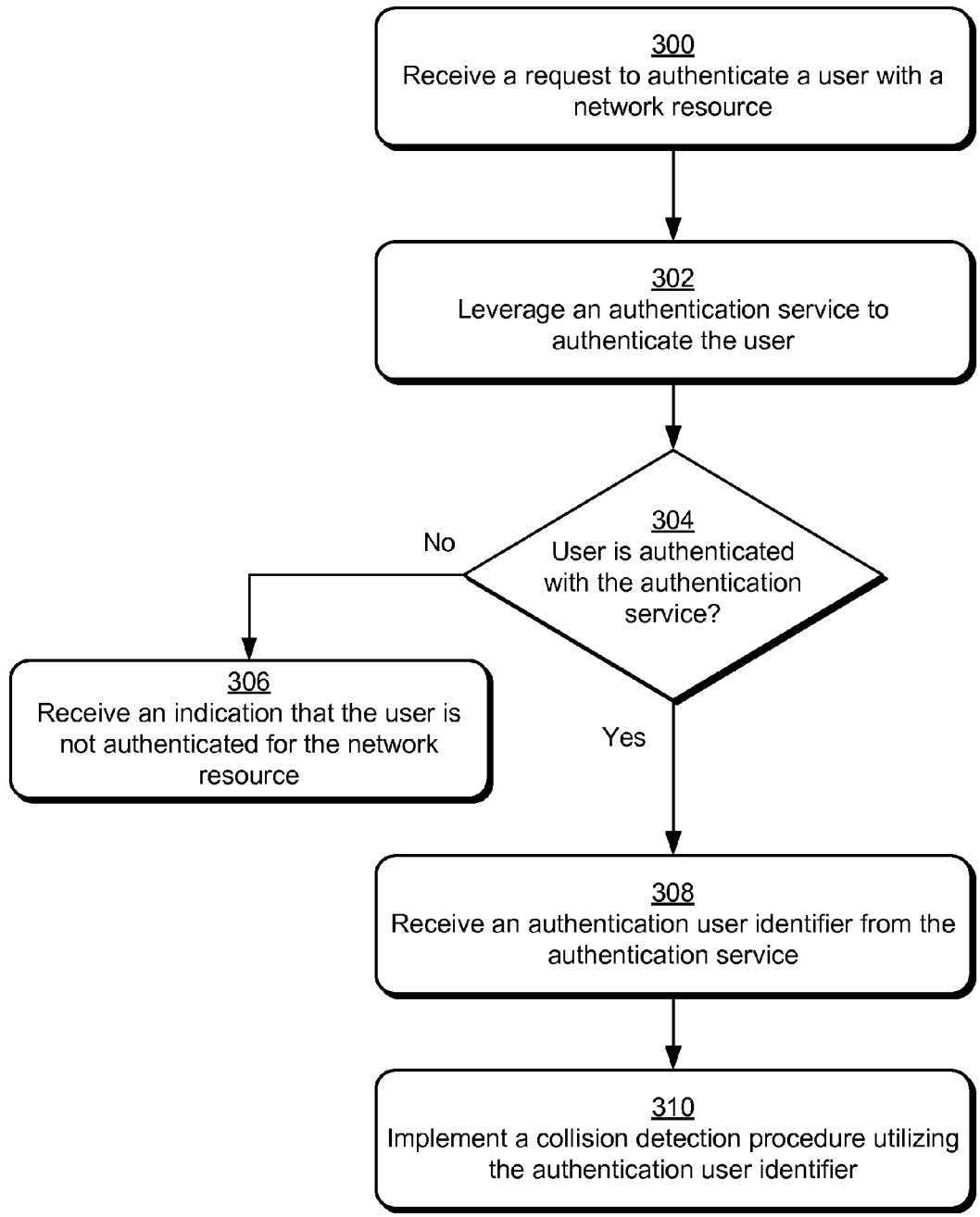
FIG. 3 is a flow diagram that describes steps in a method for determining to implement a collision detection procedure in accordance with one or more embodiments.

FIG. 3 is a flow diagram that describes steps in a method in accordance with one or more embodiments. Step 300 receives a request to authenticate a user with a network resource. The network resource 102, for example, receives a request from the resource user 104 for access to the network resource 102.

Step 302 leverages an authentication service to authenticate the user. The authentication module 108, for instance, redirects the resource user 104 and/or authentication information for the resource user to one of the authentication services 110. Generally, the authentication service refers to an authentication provider that is not directly implemented by the network resource.

Step 304 ascertains whether the user is authenticated with the authentication service. The network resource 102, for example, receives a notification from the authentication service 110 indicating whether authentication of the resource user 104 was successful.

If the authentication with the authentication service is not successful ("No"), step 306 receives an indication that the user is not authenticated for the network resource. For example, a user ID and/or authentication factor provided by the user does not match one of the service user profiles 112 maintained by the authentication service 110. Thus, the authentication service 110 notifies the network resource 102 that the authentication process failed. The user may then be denied access to the network resource 102.

If the authentication with the authentication service is successful ("Yes"), step 308 receives an authentication user identifier from the authentication service. As part of the user authentication, for instance, the resource user 104 provides authentication information to the authentication service 110, such as one of the authentication user IDs 114 and one of the authentication factors 116 that match one of the service user profiles 112. In response to the successful authentication, the network resource 102 receives a notification from the authentication service 110 that the resource user 104 was successfully authenticated. The notification includes an authentication user ID 114 for the resource user 104, and may include other information as well. According to various embodiments, the authentication user ID 114 corresponds to a user ID input by the resource user 104 as part of the authentication procedure.

Step 310 implements a collision detection procedure for the network resource utilizing the authentication user identifier. For instance, consider the following example procedure in accordance with one or more embodiments.

Figure 4:
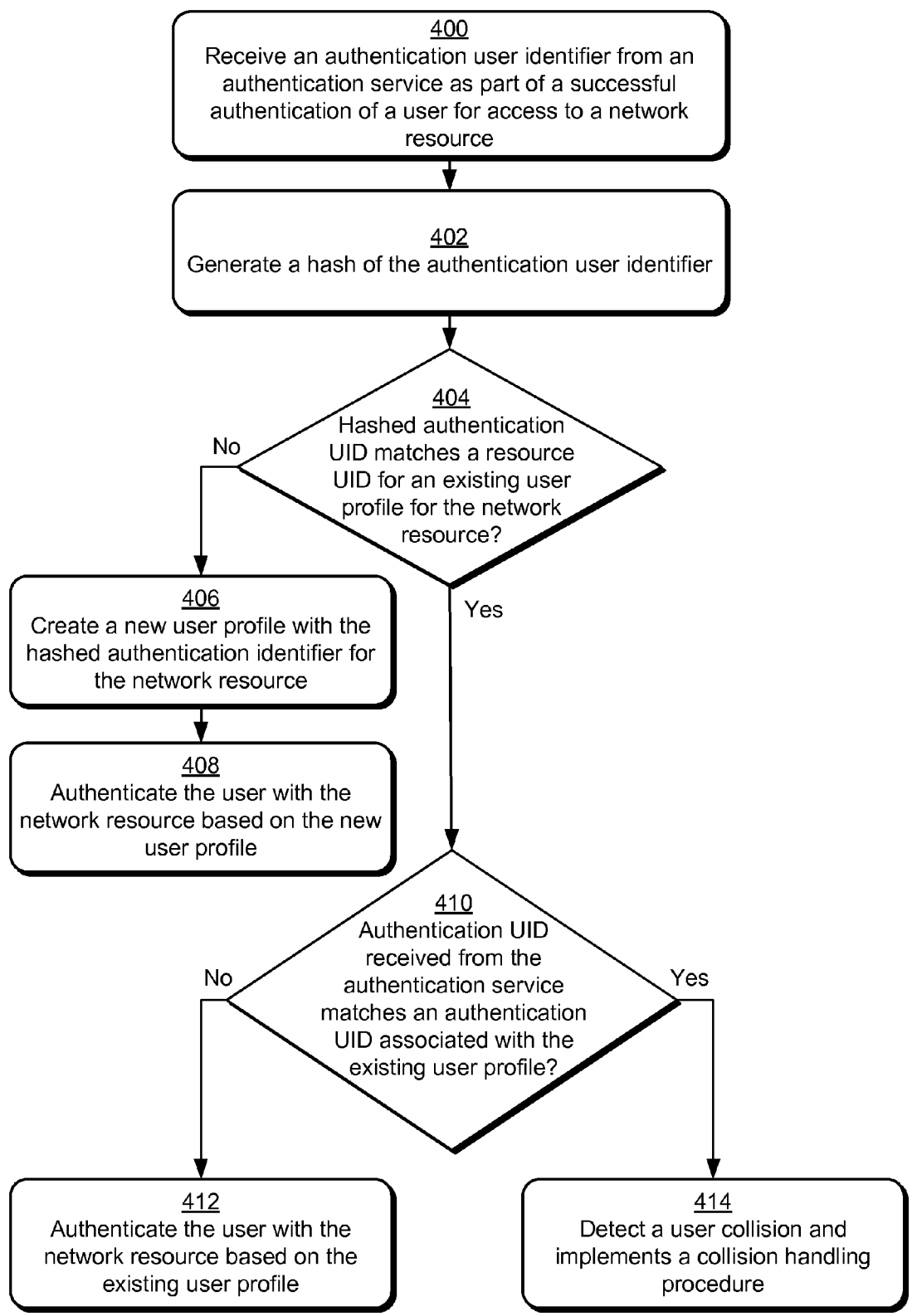
FIG. 4 is a flow diagram that describes steps in a method for determining whether a user collision occurs in accordance with one or more embodiments.

FIG. 4 is a flow diagram that describes steps in a method in accordance with one or more embodiments. The method, for example, describes an example collision detection procedure. In at least some embodiments, the method describes an example implementation of step 310 discussed above with respect to FIG. 3.

Step 400 receives an authentication user identifier from an authentication service as part of a successful authentication of a user for access to a network resource. The network resource 102, for example, receives one of the authentication user IDs 114 for the resource user 104 from the authentication service 110 in response to a successful authentication of the resource user 104 with the authentication service 110.

Step 402 generates a hash of the authentication user identifier. The authentication module 108, for example, applies a hash function to the authentication user ID 114 received from the authentication service 110. Any suitable hash function may be utilized to generate the hash, such as various types of cryptographic hash functions. Examples of hash functions that may be utilized include various versions of a Secure Hash Algorithm (SHA) function, various versions of a Message-Digest (MD) algorithm, and so on.

Step 404 determines whether the hashed authentication user identifier matches a resource user identifier for an existing user profile for the network resource. The authentication module 108, for example, compares the hashed authentication user ID 114 to the resource user IDs 120 of the resource user profiles 118. In at least some embodiments, each of the resource user profiles 118 is associated with a different, unique resource user ID 120.

If the hashed authentication user identifier does not match a resource user identifier for an existing user profile ("No"), step 406 creates a new user profile for the network resource with the hashed authentication user identifier. The network resource 102, for instance, creates a new user profile in the resource user profiles 118 and utilizes the hashed authentication user ID 114 as a new resource user ID 120 for the new resource user profile 118. The new user profile includes the new resource user ID 120 for the user, as well as the original authentication user ID 114 for the user received from the authentication service 110. The original authentication user ID 114, for instance, is stored as part of the authentication user IDs 114*a* maintained as part of the resource user profiles 118. Thus, the new resource user profile 118 can be used to differentiate the resource user 104 from other users, e.g., other users identified via profiles in the resource user profiles 118.

Step 408 authenticates the user with the network resource based on the new user profile. The resource user 104, for example, may be granted access to the network resource 102 according to various permissions and/or restrictions associated with the new resource user profile 118. In at least some embodiments, a subsequent attempt to authenticate the resource user 104 with the network resource 102 via the authentication service 110 and utilizing the same original authentication user ID 114 will authenticate the resource user 104 with the network resource 102 based on the new resource user profile 118.

Returning to step 404, if the hashed authentication user identifier matches an existing resource user identifier for an existing user profile ("Yes"), step 410 ascertains whether the authentication user identifier received from the authentication service matches an authentication user identifier associated with the existing user profile. For example, the authentication user ID 114 received from the authentication service 110 is compared to an authentication user ID 114*a* associated with the existing resource user profile 118.

If the authentication user identifier received from the authentication service matches the user identifier associated with the existing user profile ("Yes"), step 412 authenticates the user with the network resource based on the existing user profile. For instance, the user is permitted to access the network resource according to permissions and/or restrictions specified for the existing user profile.

If the authentication user identifier received from the authentication service does not match the authentication user identifier associated with the existing user profile ("No"), step 414 detects a user collision and implements a collision handling procedure. Generally, the collision handling procedure prevents the user from being authenticated as a different user associated with the existing user profile, and thus prevents the user from accessing the network resource based on the existing user profile. As an example collision handling procedure, consider the following example procedure in accordance with one or more embodiments.

Figure 5:
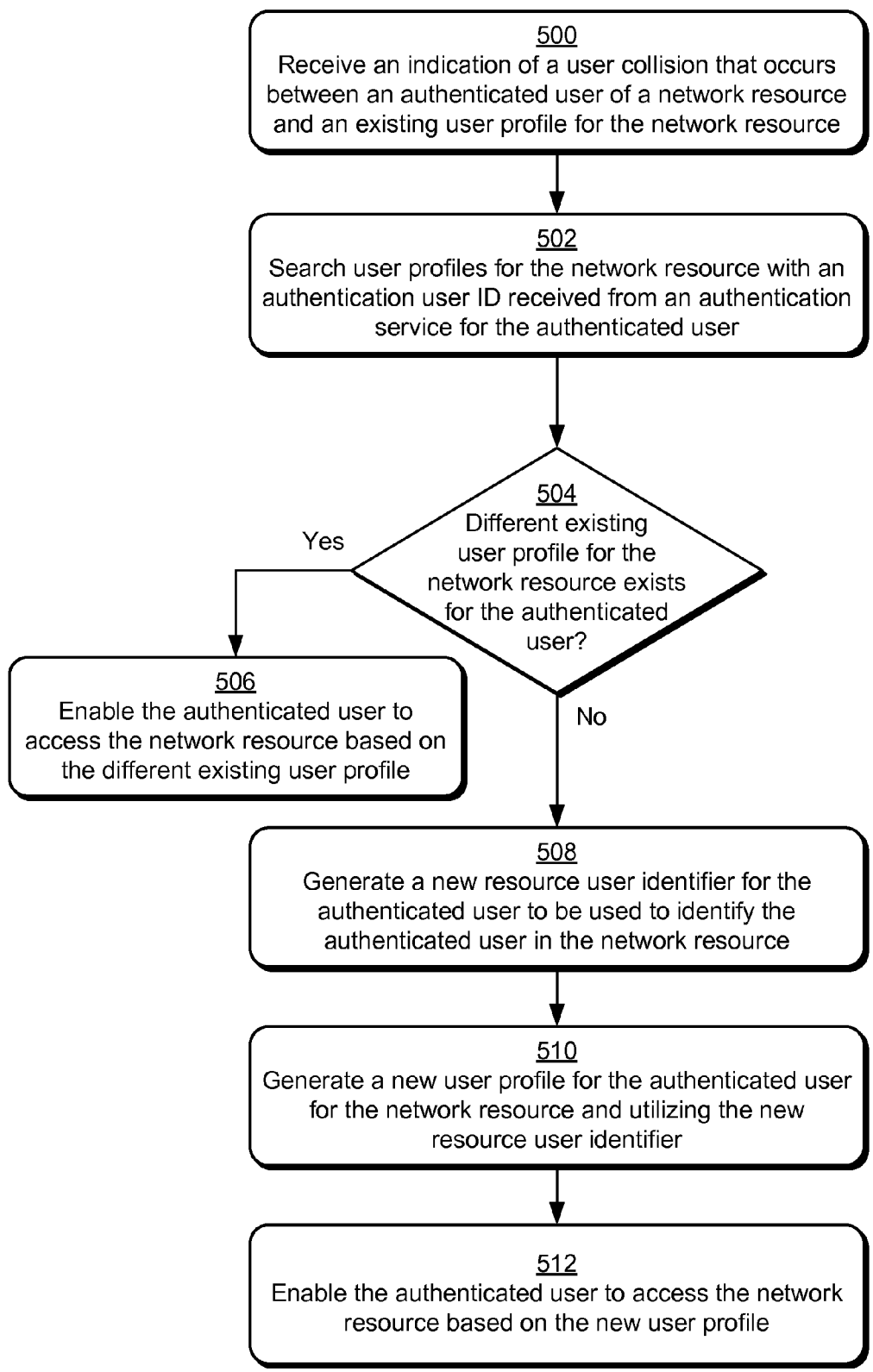
FIG. 5 is a flow diagram that describes steps in a method for handling a user collision in accordance with one or more embodiments.

FIG. 5 is a flow diagram that describes steps in a method in accordance with one or more embodiments. The method, for example, describes an example collision handling procedure. In at least some embodiments, the method describes an example extension and/or implementation of step 414 discussed above with respect to FIG. 4.

Step 500 receives an indication of a user collision that occurs between an authenticated user of a network resource and an existing user profile for the network resource. Generally, an authenticated user refers to a user that has been authenticated by an authentication service (e.g., a third-party authentication provider) and is currently in the process of being matched to a user profile for a particular network resource. Thus, the authenticated user is permitted to access the network resource, but does not yet have a user profile via which the access may be implemented.

In at least some embodiments, a user collision occurs when a resource user identifier generated by the network resource for the authenticated user (e.g., the hashed authentication user ID introduced above) matches a resource user identifier for an existing user profile for a different user of the network resource. The collision is detected when an authentication user ID received from a third-party authentication service for the authenticated user is different than an authentication user ID maintained by the network resource as part of the existing user profile for the different user. Example ways of detecting a user collision are discussed above.

Step 502 searches user profiles for the network resource with an authentication user ID received from an authentication service for the authenticated user. With reference to the network resource 102, for example, the resource user profiles 118 are searched with an authentication user ID 114 for the resource user 104 (e.g., an authenticated user) received from the authentication service 110.

Step 504 ascertains based on the search whether a different existing user profile for the network resource exists for the authenticated user. The authentication module 108, for instance, ascertains whether the resource user profiles 118 include a user profile with the authentication user ID 114 received from the authentication service 110 for the authenticated user.

If a different existing user profile for the network resource exists for the authenticated user ("Yes"), step 506 enables the authenticated user to access the network resource based on the different existing user profile. For instance, the authenticated user is permitted to access the network resource according to permissions and/or restrictions specified for the different existing user profile.

If a different existing user profile for the network resource does not exist for the authenticated user ("No"), step 508 generates a new resource user identifier for the authenticated user to be used to identify the authenticated user in the network resource. The new resource user ID, for example, corresponds to a resource user ID that is not currently being used to identify a user in the network resource. With reference to the network resource 102, for instance, the new resource user ID is different than existing resource user IDs 120 for the resource user profiles 118. Thus, the new resource user ID 120 distinguishes the authenticated user from other users identified in the resource user profiles 118. An example procedure for generating the new identifier is discussed below.

Step 510 generates a new user profile for the authenticated user for the network resource and utilizing the new resource user identifier. For instance, a new user profile for the network resource is generated that includes the new resource user ID as well as the authentication user ID received from the authentication service for the authenticated user.

Step 512 enables the authenticated user to access the network resource based on the new user profile. For instance, the authenticated user is permitted to access the network resource according to permissions and/or restrictions specified for the new user profile.

Thus, according to various embodiments the authenticated user now has an existing user profile for the network resource. Accordingly, if the authenticated user subsequently attempts to authenticate with the network resource (e.g. via the authentication service as discussed above), the authenticated user will be authenticated with the network resource based on the new user profile.

For instance, consider that after the new user profile has been generated for the authenticated user, the authenticated user subsequently requests authentication with the network resource, e.g., as part of a request for access to the network resource. The various steps of the procedures described above are implemented utilizing authentication information received for the authenticated user. When the authentication process reaches steps 502 and 504 described above, the new user profile will be located based on the authentication user ID provided by the authentication service for the authenticated user. Thus, the authenticated user will be authenticated with the network resource based on the new user profile, which will be considered an existing user profile.

Figure 6:
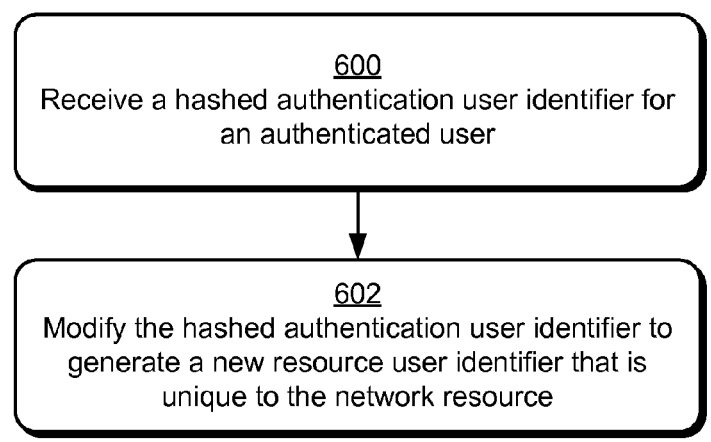
FIG. 6 is a flow diagram that describes steps in a method for generating a resource user identifier in accordance with one or more embodiments.

FIG. 6 is a flow diagram that describes steps in a method in accordance with one or more embodiments. The method, for example, describes an example procedure for generating a new resource user ID for a user of a network resource. In at least some embodiments, the method describes an example implementation of step 508 discussed above with respect to FIG. 5.

Step 600 receives a hashed authentication user identifier for an authenticated user. The hashed authentication user ID, for example, corresponds to a hashed authentication user ID generated using an authentication user ID received from an authentication service as part of a user authentication process, e.g., the hashed authentication user ID generated in step 402 discussed above. As also discussed above, the hashed authentication user ID for the authenticated user is the same as a resource user ID for an existing user profile for a different user. Thus, the hashed authentication user ID is to be modified to differentiate the authenticated user from the different user in the network resource.

Step 602 modifies the hashed authentication user identifier to generate a new resource user identifier that is unique to the network resource. The hashed authentication user ID, for example, is modified so that it no longer matches an existing user resource user ID for the network resource.

In at least some embodiments, modifying the hashed authentication user ID is implemented by incrementing a value of the hashed authentication user ID until the hashed authentication user ID no longer matches an existing resource user ID for the network resource. For instance, a value (e.g., a terminal value) of the hashed authentication user ID can be increased by one and compared to existing resource user IDs for the network resource, e.g., the resource user IDs 120 for the resource user profiles 118 of the network resource 102. If the hashed authentication user ID still matches an existing resource user ID for the network resource, the incrementing process is continued until the hashed authentication user ID no longer matches an existing resource user ID.

Once the modified authentication user ID no longer matches an existing resource user ID, the modified authentication user ID is used as a new resource user ID to be used to identify the authenticated user in the network resource. The new resource user ID, for example, is stored as part of a new user profile for the authenticated user in the network resource.

Having discussed some example procedures, consider now a discussion of an example system and device in accordance with one or more embodiments.

Example System and Device

Figure 7:
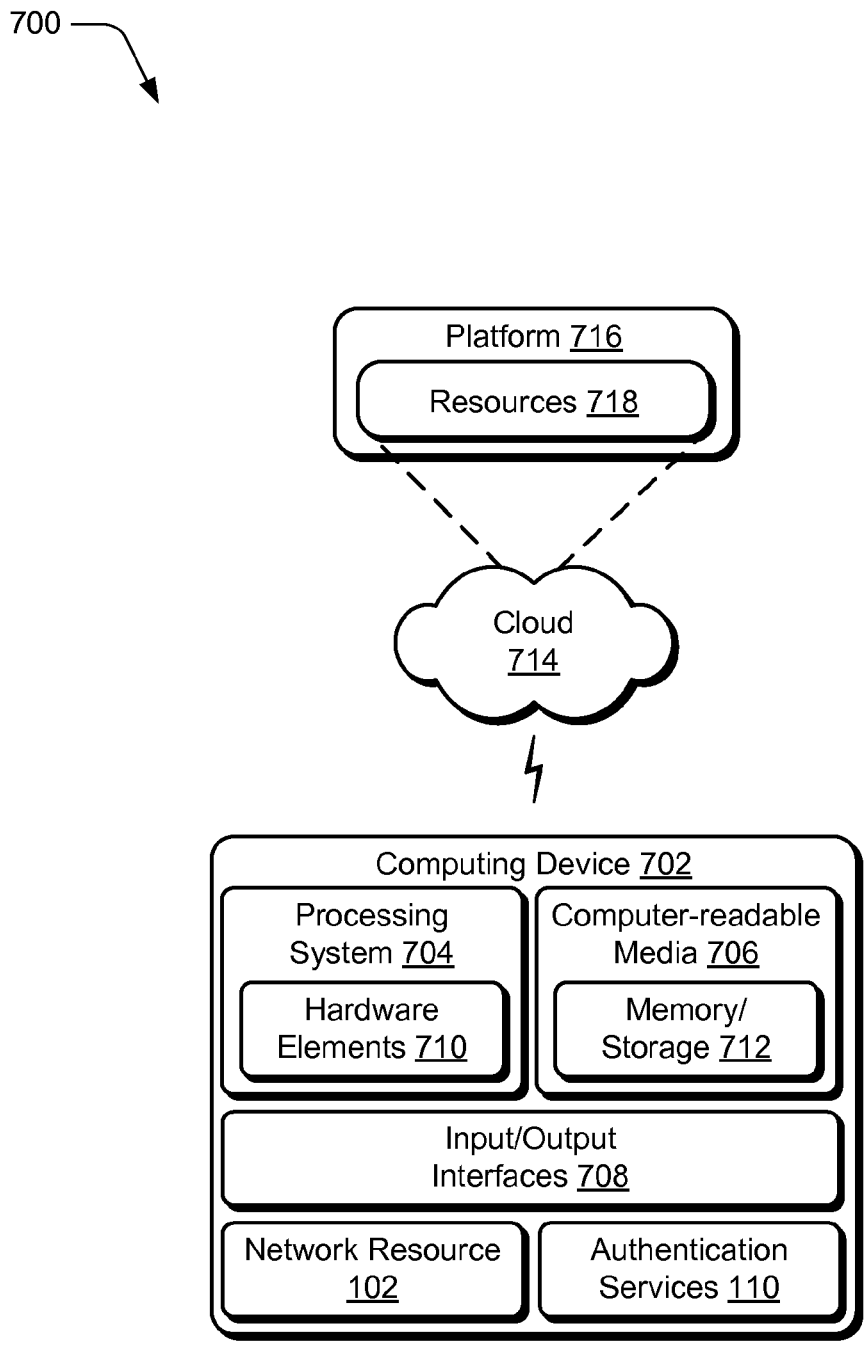
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement the various techniques described herein. This is illustrated through inclusion of the network resource 102 and the authentication services 110, which may be employed to implement techniques for user collision detection and handling discussed herein. The computing device 702 may be, for example, a server of a service provider, a device associated with a client (e.g., a client device), an on-chip system, and/or any other suitable computing device or computing system.

The computing device 702 as illustrated includes a processing system 704, one or more computer-readable media 706, and one or more I/O interfaces 708 that are communicatively coupled and/or connected, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 are illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Discussed herein are a number of methods that may be implemented to perform techniques discussed herein. Aspects of the methods may be implemented in hardware, firmware, or software, or a combination thereof. The methods are shown as a set of blocks (e.g., steps) that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 700, and so on.

Conclusion

Techniques for user collision detection and handling are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage media storing computer-executable instructions that, responsive to execution by the one or more processors, cause the system to perform operations including:
      receiving an indication that a user is authenticated with an authentication service for access to a network resource, including a first authentication user identifier for the authenticated user;
      processing the first authentication user identifier to generate a first resource user identifier to be used to identify the authenticated user in the network resource;
      detecting based on the first resource user identifier and the first authentication user identifier for the authenticated user that a user collision occurs between the authenticated user and a different user of the network resource, said detecting including determining that the first resource user identifier for the authenticated user is the same as a second resource user identifier for the different user of the network resource, and detecting that the first authentication user identifier for the authenticated user is not the same as a second authentication user identifier for the different user, the second authentication user identifier being associated with an existing user profile for the network resource; and
      implementing a collision handling procedure in response to said detecting to resolve the collision and enable the authenticated user to access the network resource, including:
         matching the first authentication user identifier to a different existing user profile for the authenticated user in the network resource; and
         enabling the authenticated user to access the network resource according to one or more of permissions or restrictions specified for the different existing user profile.

2. A system as described in claim 1, wherein said receiving occurs in response to a request by the user for access to the network resource.

3. A system as described in claim 1, wherein said processing comprises hashing the first authentication user identifier to generate the first resource user identifier.

4. A system as described in claim 1, wherein the second authentication user identifier for the different user is received from a different authentication service.

5. A system as described in claim 1, wherein said implementing comprises modifying the first resource user identifier for the authenticated user to generate a new resource user identifier for the authenticated user that is not currently in use by the network resource.

6. A computer-implemented method, comprising:
   processing a first authentication user identifier received from an authentication service to generate a first resource user identifier to be used to identify an authenticated user in a network resource;
   determining that the first resource user identifier generated for the authenticated user is the same as a second resource user identifier for a different user, and that the first authentication user identifier for the authenticated user is not the same as a second authentication user identifier for the different user, the second authentication user identifier being associated with an existing user profile for the network resource;
   detecting responsive to said determining that a user collision occurs between the authenticated user and the different user of the network resource; and
   implementing in response to said detecting a collision handling procedure to resolve the collision and enable the authenticated user to access the network resource, said implementing including:
      matching the first authentication user identifier to a different existing user profile for the authenticated user in the network resource; and
      enabling the authenticated user to access the network resource according to one or more of permissions or restrictions specified for the different existing user profile.

7. A computer-implemented method as recited in claim 6, wherein said processing is performed in response to receiving an indication that the authenticated user is authenticated with the authentication service to access the network resource.

8. A computer-implemented method as recited in claim 6, wherein said processing comprises hashing the first authentication user identifier to generate the first resource user identifier.

9. A computer-implemented method as recited in claim 6, wherein said implementing further comprises:
   modifying the first resource user identifier to generate a new resource user identifier for the authenticated user; and
   associating the new resource user identifier with the different existing user profile.

10. One or more computer-readable storage media having instructions stored thereon that, responsive to execution by one or more processors, cause the one or more processors to perform operations comprising:
    detecting that a user collision occurs between an authenticated user of a network resource and an existing user profile for a different user of the network resource; and
    handling the collision by:
       matching the authenticated user to a different existing user profile for the network resource by matching an authentication user identifier for the authenticated user to an authentication user identifier for the different existing user profile; and
       enabling the authenticated user to access the network resource based on one or more of permissions or restrictions specified for the different existing user profile.

11. One or more computer-readable storage media as recited in claim 10, wherein said detecting occurs in response to receiving a request from the authenticated user for access to the network resource.

12. One or more computer-readable storage media as recited in claim 10, wherein said detecting comprises receiving an indication that a resource user identifier generated for the authenticated user matches a resource user identifier for the different user, and that an authentication user identifier for the authenticated user is not the same as the authentication user identifier for the existing user profile.

13. One or more computer-readable storage media as recited in claim 10, further comprising modifying the resource user identifier for the authenticated user to generate a new resource user identifier for the authenticated user, and storing the new resource user identifier as part of the different existing user profile for the authenticated user.

14. One or more computer-readable storage media as recited in claim 13, wherein said modifying comprises incrementing one or more values of the resource user identifier to generate the new resource user identifier for the authenticated user.

15. One or more computer-readable storage media as recited in claim 10, wherein the operations further comprise, prior to said detecting, receiving an indication from an authentication service that the authenticated user is authenticated for access to the network resource.

16. A system as described in claim 1, wherein the operations further include:
modifying the first resource user identifier for the authenticated user to generate a new resource user identifier for the authenticated user; and
utilizing the new resource user identifier to enable the authenticated user to access the network resource according to the different existing user profile.

17. A system as described in claim 1, wherein said implementing comprises modifying the first resource user identifier for the authenticated user to generate a new resource user identifier for the authenticated user that is not currently in use by the network resource, and wherein said modifying comprises incrementing one or more values of the resource user identifier to generate the new resource user identifier.

18. A computer-implemented method as recited in claim 6, wherein said implementing further comprises modifying the first resource user identifier to generate a new resource user identifier for the authenticated user, and wherein said modifying comprises incrementing one or more values of the resource user identifier to generate the new resource user identifier.

19. A computer-implemented method as recited in claim 6, wherein said processing occurs in response to receiving a request from the authenticated user for access to the network resource.

20. One or more computer-readable storage media as recited in claim 10, wherein the operations further comprise, prior to said detecting, receiving an indication from a social media platform that the authenticated user is authenticated with the social media platform for access to the network resource.

* * * * *